(12) United States Patent
Ferguson et al.

(10) Patent No.: US 7,857,337 B2
(45) Date of Patent: Dec. 28, 2010

(54) MOTORIZED COLLAPSIBLE STEP

(75) Inventors: Brock E. Ferguson, Cottage Grove, OR (US); Richard W. Raley, Cottage Grove, OR (US)

(73) Assignee: Actuant Corporation, Butler, WI (US)

( * ) Notice: Subject to any disclaimer, the term of this patent is extended or adjusted under 35 U.S.C. 154(b) by 264 days.

(21) Appl. No.: 12/020,116

(22) Filed: Jan. 25, 2008

(65) Prior Publication Data

US 2009/0189365 A1    Jul. 30, 2009

(51) Int. Cl.
*B60R 3/02* (2006.01)
(52) U.S. Cl. .................. 280/166; 280/163; 182/127
(58) Field of Classification Search .............. 280/163, 280/164.1, 164.2, 166, 169; 182/88, 127
See application file for complete search history.

(56) References Cited

U.S. PATENT DOCUMENTS

| | | | |
|---|---|---|---|
| 4,108,457 A * | 8/1978 | Garrett | 280/166 |
| 4,110,673 A | 8/1978 | Magy et al. | |
| 4,180,143 A * | 12/1979 | Clugston | 182/91 |
| 5,085,450 A | 2/1992 | DeHart, Sr. | |
| 5,505,476 A | 4/1996 | Maccabee | |
| 5,547,040 A | 8/1996 | Hanser et al. | |
| 5,842,709 A | 12/1998 | Maccabee | |
| 5,957,237 A * | 9/1999 | Tigner | 182/127 |
| 6,082,751 A * | 7/2000 | Hanes et al. | 280/163 |
| 6,213,486 B1 | 4/2001 | Kunz et al. | |
| 6,655,706 B1 | 12/2003 | Murrell | |
| 6,659,224 B2 * | 12/2003 | Medsker | 182/91 |
| 6,942,233 B2 | 9/2005 | Leitner | |
| 7,377,531 B2 | 5/2008 | Fabiano et al. | |
| 7,413,204 B2 | 8/2008 | Leitner | |
| 7,513,520 B2 | 4/2009 | Okuyama | |
| 2008/0157500 A1 * | 7/2008 | Raley et al. | 280/166 |

\* cited by examiner

*Primary Examiner*—J. Allen Shriver, II
*Assistant Examiner*—John D. Walters
(74) *Attorney, Agent, or Firm*—Quarles & Brady LLP

(57) ABSTRACT

The present invention provides an improved collapsible step assembly for recreational vehicles. The movable step apparatus comprises a mounting frame, at least one step mounted to the frame through a linkage assembly, and a pivot rod with a longitudinal axis of rotation. In use, the pivot rod is rotatably mounted to the frame and rotates the linkage assembly and the at least one step between an extended position and a retracted position. Rotating the pivot rod in a first direction moves the step to the extended position, and rotating the pivot rod in the opposite direction moves the step to the retracted position. The linkage assembly includes a link which is movable in the direction of the link toward extension of the step to contact a stop of the frame that reacts against a gravitational load acting on the step.

16 Claims, 4 Drawing Sheets

MOTORIZED COLLAPSIBLE STEP

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates generally to movable step assemblies for recreational vehicles and in particular to an apparatus for extending and retracting a movable step assembly.

BACKGROUND OF THE INVENTION

Automatic step systems for recreational vehicles, motor homes, and the like are well known in the art. These systems are typically electrically-controlled and electrically-actuated to extend and retract an entryway step in response to a signal provided by an individual wishing to enter or exit the vehicle. One common system extends the step when the vehicle door is opened, and then retracts the step when the vehicle door is closed. Other systems offer a switch located just inside the vehicle door which controls the extension and retraction of the step. These systems also include a master power switch which can be used to lock the step in a given position.

Alternative systems incorporate a motor assembly for automatically-extending and retracting the step assembly. The motor rotates a pivot rod through a gear assembly which is coupled to the rod. The pivot rod moves a linkage assembly to extend and retract the steps. However, these systems can give the step a "spongy" or unstable feel. In addition, a load applied to the step tends to move the step towards the retracted position. Therefore, an improved mechanism for extending and retracting collapsible steps in recreational vehicles is needed.

SUMMARY OF THE INVENTION

The present invention provides an improved collapsible step assembly for recreational vehicles. In one aspect, the invention provides a movable step apparatus including a mounting frame, at least one step mounted to the frame through a linkage assembly with at least two non-parallel links and a pivot member having a longitudinal axis of rotation. A gravitational load on the step urges at least one of the links of the linkage assembly in the direction of rotation of the link toward extension of the step to press against a stop of the frame to react against the load.

In one aspect, the invention provides a movable step apparatus including a mounting frame, a motor mounted to the frame, at least one step mounted to the frame, a pivot member mounted to the frame, a linkage assembly, and a transmission assembly. The at least one step is mounted to the frame through the linkage assembly.

In use, the pivot member is rotatably mounted to the frame. The transmission assembly rotates the pivot member, the linkage assembly, and the at least one step between an extended position and a retracted position. Rotating the pivot member in a first direction moves the step to the extended position, and rotating the pivot member in an opposite direction moves the step to the retracted position.

Opposing ends of the pivot member are attached to the linkage assembly. The linkage assembly comprises a plurality of links pivotally connecting the frame to the at least one step. The linkage assembly also includes a link that is movable to contact a stop. When the at least one step is in the extended position, the link contacts the stop, and the stop reacts against the load applied to the at least one step.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
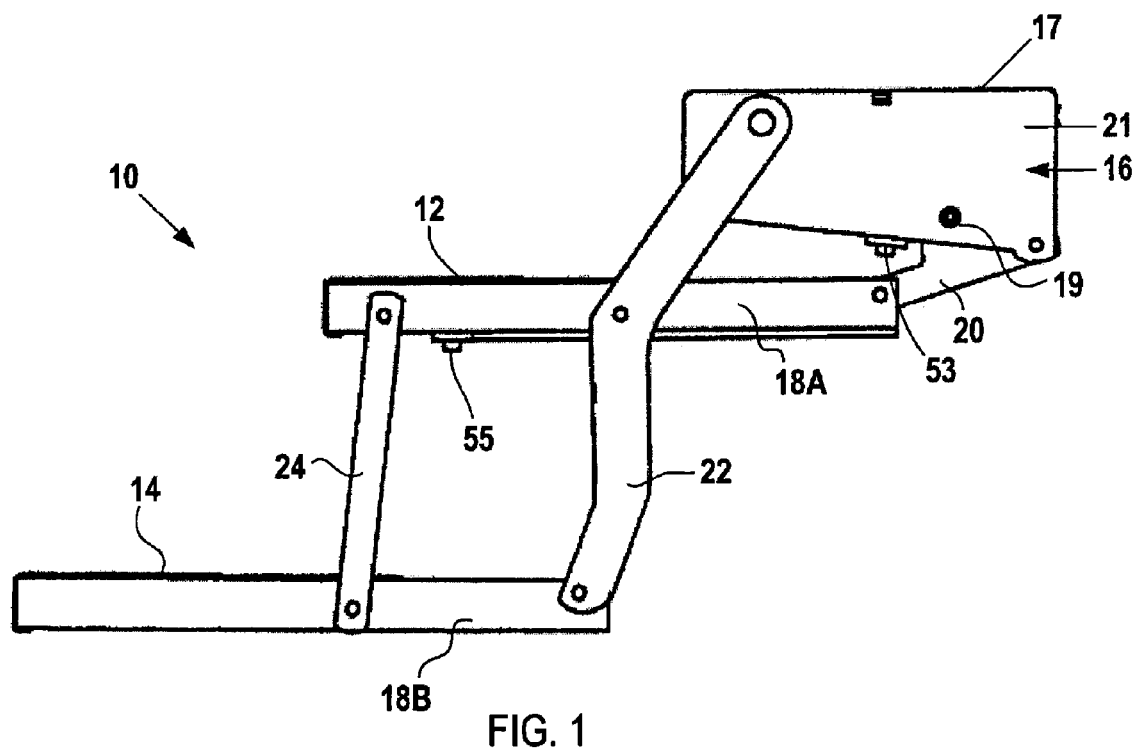
FIG. 1 is a side plan view of a step assembly of the invention in an extended position.
Figure 2:
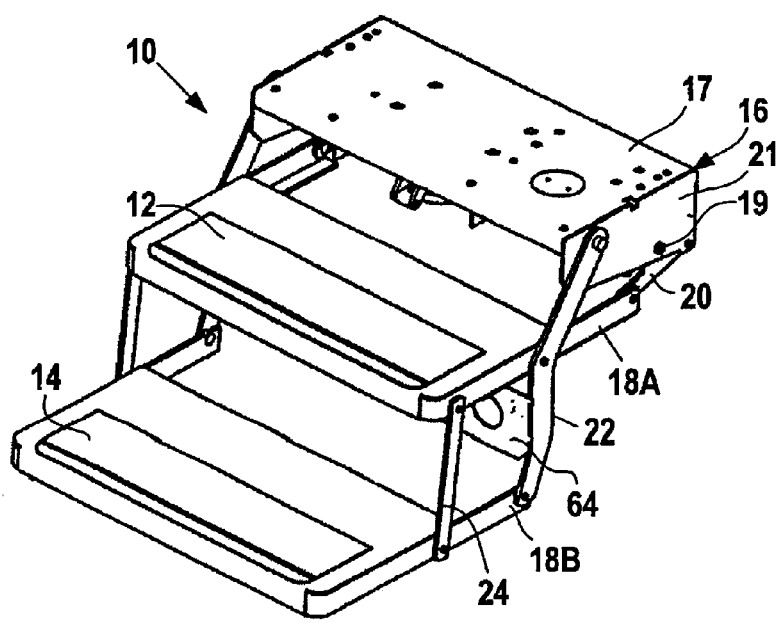
FIG. 2 is a front, top perspective view of the step assembly in the extended position.

The invention comprises a collapsible step assembly 10 for use with recreational vehicles. Referring to FIGS. 1-4, the assembly 10 comprises a generally rectangular and planar upper step 12, a lower step 14, and a frame 16. The steps 12 and 14 move between an extended position (FIGS. 1, 2 and 3) and a retracted position (FIG. 4).

Each step 12 and 14 may be covered with a non-skid material (not shown) to increase the friction of their respective surfaces. The lengths of the steps 12 and 14 are approximately one-half of their respective widths.

Each step 12 and 14 also has arms 18A and 18B, respectively, which extend in a rearward direction from their outer edges. Arms 18A and 18B are symmetrically arrayed along each side of the assembly 10. For simplicity, these components are only numbered on a single side of the assembly 10 in FIGS. 2 and 3. Arms 18A and 18B are approximately equal in length to the steps 12 and 14 and may be reinforced by pieces of angle bar stock welded to them as illustrated on arm 18A.

The frame 16 is generally box-like in shape and has open front, rear and bottom sides. The frame 16 includes a top bracket 17 and side brackets 21. Each side bracket 21 includes a stop 19, which is a pin that is welded, screwed or secured with a nut or other suitable fastener to the side bracket 21. The purpose of stops 19 is explained below. The plane of the top bracket 17 is generally horizontal when the assembly 10 is properly installed on a recreational vehicle on level ground. The steps 12 and 14 are located below the frame 16 in the retracted position as shown in FIG. 4. The frame 16 may also include a mounting assembly for attachment to a vehicle (not shown), or may be bolted, welded, or otherwise fixed to the vehicle.

As seen in FIG. 1, when the assembly 10 is in the extended position, the steps 12 and 14 are generally parallel relative to each other and the top bracket 17. As seen in FIG. 4, when the assembly 10 is in the retracted position, the steps 12 and 14 are skewed rearward and downward at approximately 10 degrees and 15 degrees, respectively, relative to the top bracket 17.

The steps 12 and 14 and the frame 16 are interconnected by a linkage assembly including three types of pivotable links; rearward links 20, medial links 22, and forward links 24. The links 20, 22, and 24 comprise straight, flat metal strips having two opposing lower and upper ends symmetrically arrayed along each side of the assembly 10. For simplicity, these components are only numbered on a single side of the assembly 10 in FIGS. 2 and 3. The links 20, 22, and 24 pivot around each point of attachment between the extended and retracted positions. Rectangular support bracket 64 is secured to the medial links 22 to reinforce the assembly 10 during use. The forward links 24 may also include a support bracket to reinforce the assembly during use.

The rearward links 20 connect the upper step 12 to the frame 16. As most easily seen in FIG. 1, the upper ends of each rearward link 20 are pivotally mounted near the lower rearward corners of the side brackets 21. The lower ends of each rearward link 20 are pivotally mounted near the rearward ends of the upper step arms 18A. Each rearward link 20 also includes a tab 23 as most easily seen in FIG. 3. The purpose of the tab 23 is explained below.

As seen in FIG. 1, when the assembly 10 is in the extended position, the rearward links 20 are skewed downward and forward at approximately 15 degrees relative to the top bracket 17. As seen in FIG. 4, when the assembly 10 is in the retracted position, the rearward links 20 are skewed rearward and downward at approximately 35 degrees relative to the top bracket 17.

The medial links 22 have a dogleg shape and pivotally connect the lower step 14 to the frame 16 and have approximate midpoints pivotally connected to the upper step 12 near the point where the step 12 meets the upper step arm 18A. Each medial link 22 is approximately three times as long as and slightly wider than the rearward links 20. The upper ends of the medial links 22 are pivotally mounted to the upper forward corners of the side brackets 21. The lower ends of the medial links 22 are pivotally mounted near the ends of the lower step arms 18B. The pivot rod 26 connects to the upper ends of the medial links 22 at opposing ends of the rod 26.

As seen in FIG. 1, when the assembly 10 is in the extended position, the medial links 22 are skewed forward and downward at approximately 70 degrees relative to the top bracket 17 and approximately straight down from step 12. As seen in FIG. 4, when the assembly 10 is in the retracted position, the medial links 22 are skewed rearward and downward at approximately 35 degrees relative to the top bracket 17.

The forward links 24 connect the lower step 14 to the upper step 12. The forward links 24 are approximately twice as long as the rearward links 20 and approximately half the length of the medial links 22. The upper ends of the forward links 24 are pivotally mounted near the forward corners of the upper step 12. The lower ends of the forward links 24 are pivotally mounted to the lower step 14 near the point where the lower step arm 18B extends from the lower step 14.

As seen in FIG. 1, when the assembly 10 is in the extended position, the forward links 24 are skewed downward and slightly forward at approximately 85 degrees relative to the top bracket 17. As seen in FIG. 4, when the assembly 10 is in the retracted position, the forward links 24 are skewed rearward and downward at approximately 25 degrees relative to the top bracket 17.

Figure 3:
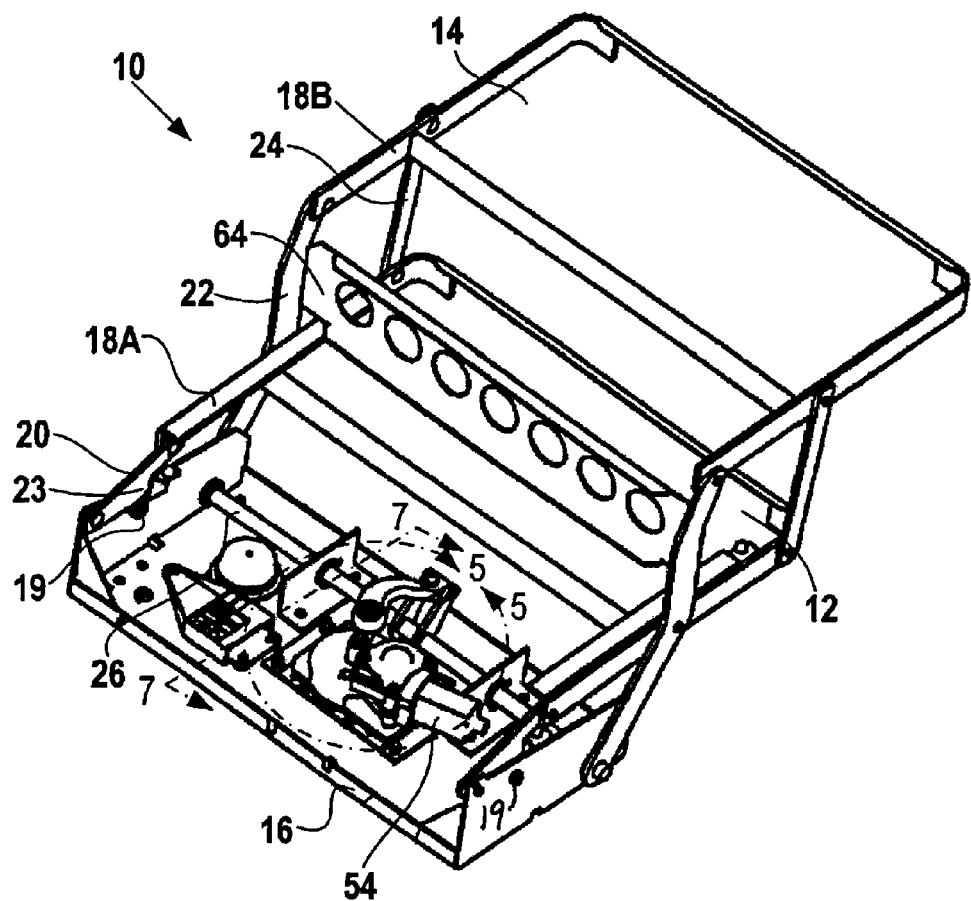
FIG. 3 is a rear, bottom perspective view of the step assembly in the extended position.
Figure 4:
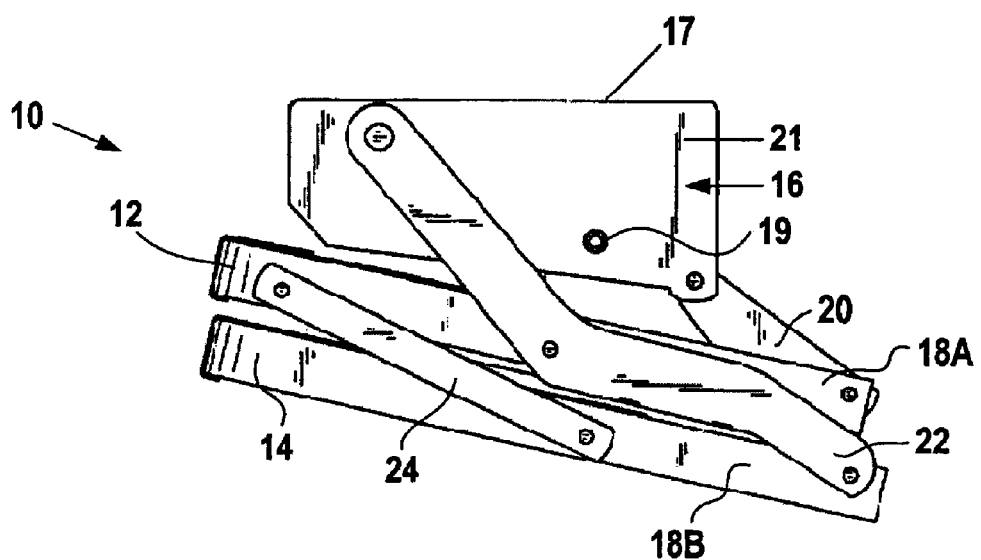
FIG. 4 is a side plan view of the step assembly in a retracted position.

Referring to FIG. 3, the assembly 10 also includes a pivot rod 26 extending transversely through the frame 16. The longitudinal axis of the pivot rod 26 is generally perpendicular to the surface of the side brackets 21. The pivot rod 26 connects to the upper ends of the medial links 22 at opposing ends of the rod 26. As seen in FIGS. 5-8, the pivot rod 26 also includes a short finger assembly 36 rigidly mounted to the rod 26. The finger assembly 36 extends radially away from the longitudinal axis of the rod 26. A link arm 38 with a fixed length is connected to the finger assembly 36 with a universal joint 40. The universal joint 40 allows the finger assembly 36 and link arm 38 to pivot about generally vertical (about pivot 41) and horizontal (about the axis of the pin 35 extending through the two arms 36) axes relative to the fingers 36.

The link arm 38 is swively-mounted to a horizontal drive gear 42 by a ball joint 39 at the end of crank arm 44 which is fixed to gear 42. The gear 42 has teeth (not shown) which extend circumferentially along an arcuate edge portion of the gear 42. The gear 42 is centrally and pivotally mounted with a second pivot pin 48 to a motor mounting plate 50. The motor mounting plate 50 is mounted to the frame 16. The gear teeth (not shown) engage a second drive gear (not shown) within housing 52 which extends from a lower side of a motor 54. The motor 54 is also mounted to the motor mounting plate 50.

Figure 5:
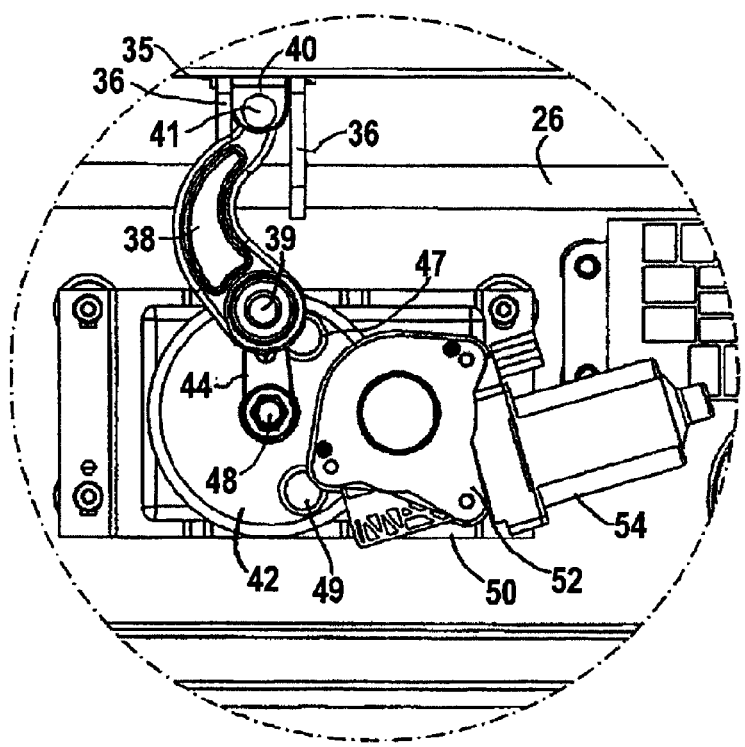
FIG. 5 is a detail view of the drive portion of the step assembly in the extended position circumscribed by line 5-5 in FIG. 3.
Figure 6:
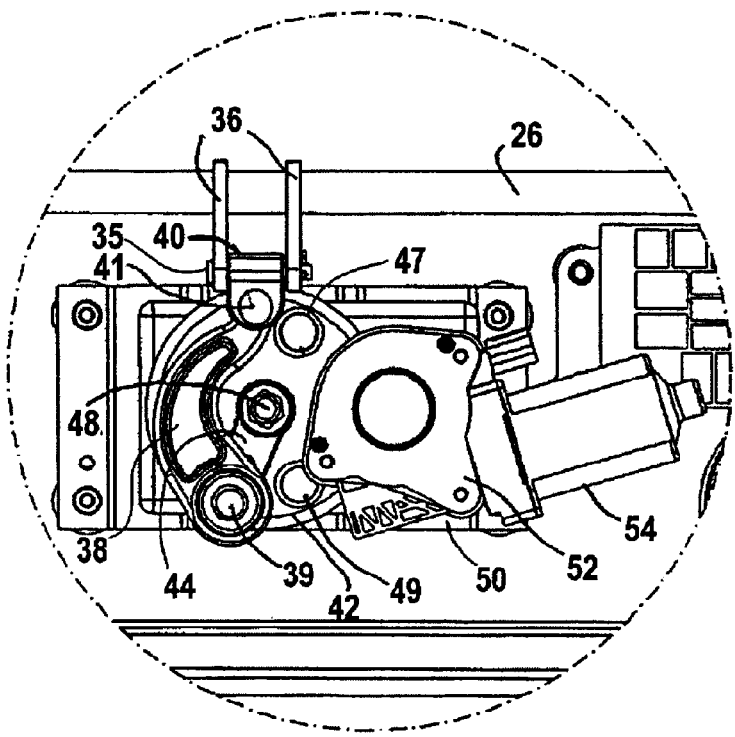
FIG. 6 is a detail view of the drive portion of the step assembly of FIG. 5 but in the retracted position.
Figure 7:
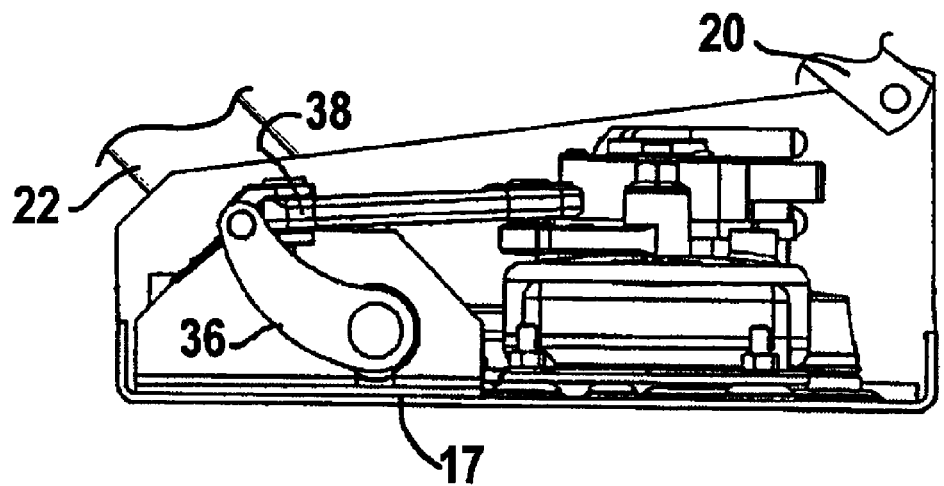
FIG. 7 is a detail cross sectional view of the step assembly in the extended position along line 7-7 in FIG. 3.
Figure 8:
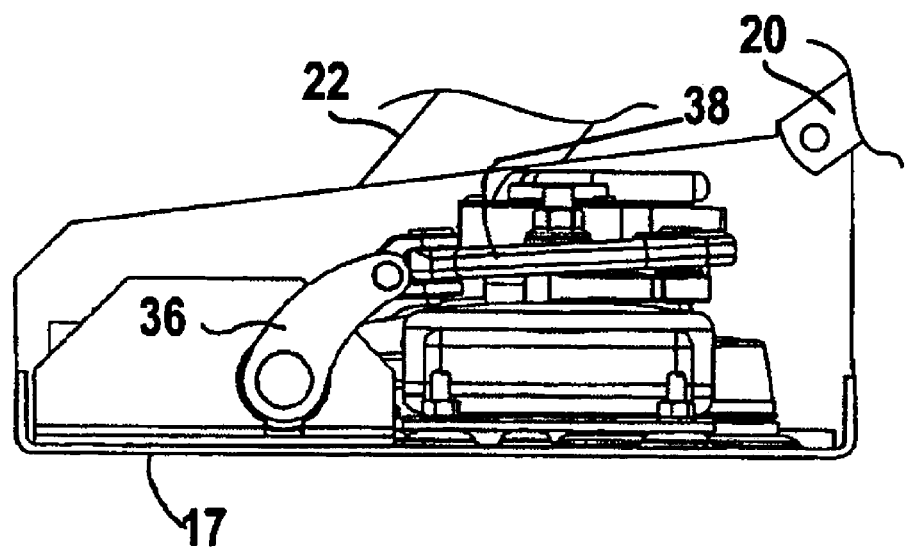
FIG. 8 is a detail cross sectional view of the step assembly of FIG. 7 in the retracted position.

As shown in FIGS. 5 and 7, when the assembly 10 is in the extended position, the finger assembly 36 extends forward and downward relative to the pivot rod 26, and the link arm 38 is horizontally rotated to a position below the pivot rod 26. As shown in FIGS. 6 and 8, when the assembly is in the retracted position, the finger assembly 36 extends rearward and downward relative to the rod 26, and the link arm 38 is rotated to a position below the drive gear 42.

The motor 54 rotates the segment gear 42 approximately 90 degrees between the extended and retracted positions. The particular drive for driving the gear within housing 52 that meshes with segment gear 42 may be a worm gear drive, although any suitable drive could be used to rotate rod 26.

In use, the frame 16 of the assembly 10 is mounted to the underside of a vehicle adjacent to the doorway (not shown). Prior to use, the assembly 10 is in the retracted position so that the upper and lower steps 12 and 14 are recessed beneath the frame 16, as shown in FIG. 4. When the assembly 10 is actuated to move to the extended position, the motor 54 and associated drive train rotates the gear 42 clockwise approximately 90 degrees. As the gear 42 moves between these positions, the link arm 38 pushes the finger assembly 36 in a direction away from the gear 42 so that the rod 26 is rotated so as to extend the linkage assembly. This rotation causes the upper and lower steps 12 and 14 to move to the extended position.

When the step assembly 10 is in the extended position (FIGS. 1 through 3), the tab 23 on the rearward link 20 engages the stop 19 on the side bracket 21 of the frame 16. Applying a load to either step has a tendency to press the tab 23 on the rearward link 20 against the stop 19, tending to rotate the link 20 further in the direction it rotates relative to the frame 16 when the step is extending, i.e., clockwise as viewed in FIG. 3. That is, the size and orientation of the links results in a gravitational load on either step holding the step assembly 10 in the extended position, with the link 20 pressing against the stop 19 so that the stop 19 reacts against the load. Additionally, the assembly 10 can still support the load if the motor/drive unit is removed. This is possible since the stop 19 completely resists the load applied on either step. In addition, the step assembly 10 does not need to be preloaded since the applied gravitational load does not tend to move the assembly to the retracted position.

When the step assembly 10 is extended, the arm 44 engages a stop 47, as shown in FIG. 5. This stop 47 is engaged in addition to the tab 23 on the rearward link 20 engaging the stop 19. The stop 47 is engaged after the tab 23 on the rearward link 20 engages the stop 19. Therefore, play from the step assembly 10 is reduced since the arm 44 continues to move after the tab 23 on the rearward link 20 engages the stop 19.

The stop 19 on the frame 16 may be a rotatable eccentric cam. If this is the case, rotating the stop 19 changes the extended position of the step assembly 10. Dimensional uncertainties of the linkage assembly may cause the steps to be non-parallel or rotated at an angle with respect to the top bracket 17 of the frame 16. The eccentric cam may be useful for making adjustments to ensure the steps are properly positioned if such problems occur. If the stop 19 is an eccentric cam, the stop 19 may also include a nut on the outer surface of the side bracket 21 for convenient adjustment of the stop 19.

When the step assembly 10 is retracted, as shown in FIG. 4, the upper step 12 is preferably pulled against bumpers 53 on each side of the frame 16. The lower step 14 is also pulled against bumpers 55 on the bottom of the upper step 12. In addition, the arm 44 moves near, but does not normally engage, a stop 49, as shown in FIG. 6.

Motion of the step assembly is preferably controlled by a current sensor. When the steps 12 and 14 contact bumpers 53 and 55 or the rearward link 20 contacts the stop 19 in the retracted or extended positions, respectively, the motor current will suddenly increase. The current sensor is capable of determining if a current threshold has been exceeded for the duration of a set time period. If such a current increase is sensed, the current sensor sends a signal to a controller to stop motion of the step assembly 10. The current threshold and time period may be selected as appropriate for the current requirements of the motor 54.

Of course, the description set out above is merely of an exemplary preferred version of the invention, and it is contemplated that numerous additions and modifications can be made. The example should not be construed as describing the only possible version of the invention, and the true scope of the invention will be defined by the claims.

We claim:

1. A movable step apparatus, comprising:
    a mounting frame;
    at least one step;
    a pivot rod mounted to the frame to pivot about an axis that is generally parallel to the frame;
    a linkage assembly pivotally connecting the at least one step and the frame, and the linkage assembly being connected to the pivot rod and including at least two links, each link having a longitudinal axis that extends between pivot points of the link where the link is connected to the frame and to the at least one step, and wherein the axes of the links are non-parallel when the step is in an extended position;
    a crank arm driven by a motor, the crank arm being rotatable about an axis of rotation to thereby cause the pivot rod to move the at least one step to the extended position from a retracted position and vice versa, whereby rotating the pivot rod in a first direction causes the at least one step to move to the extended position, and rotating the pivot rod in a second direction causes the at least one step to move to the retracted position, and wherein at least one of the links of the linkage assembly contacts a stop of the frame in the extended position, such that a gravitational force on the step rotates said at least one link further in a direction of rotation of the link that the link rotates in toward the extended position of the step, so that the at least one link is pressed against the stop and the stop reacts against the gravitational load;
    a transmission stop, the crank arm engaging the transmission stop in the extended position; and
    wherein when the step moves toward the extended position, the at least one of the links contacts the stop of the frame before the crank arm contacts the transmission stop.

2. The apparatus of claim 1, wherein the at least one link is a rearward link of the linkage assembly.

3. The apparatus of claim 2, wherein the rearward link extends downwardly and forwardly in the extended position.

4. The apparatus of claim 1, wherein the at least one link includes a tab that contacts the stop.

5. The apparatus of claim 1, wherein the at least one link is not directly connected to the pivot rod.

6. The apparatus of claim 1, wherein the stop of the frame is located on a side bracket of the frame.

7. The apparatus of claim 1, wherein the at least two links of the linkage assembly comprise:
    a rearward link pivotally connecting the frame to the at least one step;
    a medial link pivotally connecting the frame to the at least one step and to a second step; and
    the linkage assembly further comprises a forward link pivotally connecting the steps.

8. The apparatus of claim 7, wherein an angle from horizontal of the rearward link is less than an angle from horizontal of the medial link when the step is in the extended position.

9. The apparatus of claim 7, wherein a length of the rearward link is less than a length of the medial link.

10. A movable step apparatus, comprising:
    a mounting frame;
    at least one step;
    a pivot rod mounted to the frame to pivot about an axis that is generally parallel to the frame;
    a linkage assembly pivotally connecting the at least one step and the frame, and the linkage assembly being connected to the pivot rod, whereby rotating the pivot rod in a first direction causes the at least one step to move to an extended position, and rotating the pivot rod in a second direction causes the at least one step to move to a retracted position;
    a transmission assembly comprising a drive gear driven by a motor, the drive gear being rotatable about an axis of rotation, the transmission assembly being coupled between the motor and the pivot rod such that rotating the motor in a first direction causes the pivot rod to move the at least one step to the extended position, and rotating the motor in a second direction causes the pivot rod to move the at least one step to the retracted position;
    wherein the linkage assembly includes a link which is movable to contact a stop of the frame when the step is in the extended position, the linkage assembly being configured such that a gravitational force on the step in the extended position is reacted against by the link pressing against the stop of the frame; and
    wherein the link is a rearward link, and the rearward link extends downwardly and forwardly in the extended position.

11. The apparatus of claim 10, wherein the link is not directly connected to the pivot rod.

12. The apparatus of claim 10, wherein the stop is located on a side bracket of the frame.

13. The apparatus of claim 10, wherein the linkage assembly includes a plurality of links.

14. The apparatus of claim 13, wherein the linkage assembly comprises:
   the rearward link pivotally connecting the frame to a first at least one step;
   a medial link pivotally connecting the frame to the first at least one step and a second at least one step; and
   a forward link pivotally connecting the first and second at least one step.

15. The apparatus of claim 14, wherein an angle from horizontal of the rearward link is less than an angle from horizontal of the medial link when the step is in the extended position.

16. The apparatus of claim 14, wherein a length of the rearward link is less than a length of the medial link.

* * * * *